2,926,090
Patented Feb. 23, 1960

2,926,090

METHOD OF TENDERING AND FLAVORING MEAT

Beverly E. Williams, La Grange Park, Ill., assignor to Hodges Research and Development Company, New York, N.Y., a corporation of California No Drawing. Application October 10, 1958
Serial No. 766,400

10 Claims. (Cl. 99—107)

This invention relates to methods for accelerating the tendering and flavoring and improving the color of meat and more particularly to methods for the production of tenderized, flavorized ripened beef.

In regard to flavor, most people associate aged flavor with the taint of long "hung" meat. This flavor is preferred by some if it is not too distinct but is not preferred if it is too dominant. If there is too much "aged flavor," it is often called "high," "off flavor," or "tainted." The younger generation is not used to this flavor and does not like it. It is acceptable, not in the home, but in night clubs preceded by drinks.

I have found that if the meat to be tendered is subjected to the bacteria Pseudomonas and the bacteria Achromobacter, or both, under controlled conditions of temperature and time with destruction of these bacteria by sterilization during the later part of the tendering cycle, the meat will have a greatly improved tenderness and will have the taste usually associated with meat carefully and properly aged by conventional, time consuming procedures. The meat so tendered will not have the "tainted" or "off flavor" because the action of the bacteria is terminated by sterilization before these undesirable conditions are reached. Pseudomonas and Achromobacter are not harmful or deleterious bacteria such as Salmonellae, Clostridia, or Micrococci and are native and natural to meat. The latter are gram positive aerobic food poisoning bacteria which cause staphylococcus infection, while Clostridia are gram positive anaerobes which cause botulism. Salmonellae are gram negative aerobes.

The temperature cycle improves the tenderness a grade or two so that a U.S. Good loin or other cut, processed in accordance with the present concept, would be voted overwhelmingly superior in tenderness and flavor to a U.S. Choice loin hung for the same period in a regular cooler. The two would be given split votes if the U.S. Choice were hung twenty-one days versus the U.S. Good in accordance with the present concept, some preferring one and some the other. If a loin is treated in accordance with the present invention and its mate from the same animal is hung or aged for 21 days as is conventional, the treated loin would be preferred by as great a margin as nine to one for both flavor and tenderness. The present invention elevates meat one or more full grades.

I have now found that the time required for properly tendering and ripening beef under controlled conditions of temperature and humidity when Pseudomonas or Achromobacter is introduced into the space containing the meat may be substantially reduced to approximately 48 hours if a cycling of temperature during the aging of meat is employed. More specifically, I have now found that chilled beef can be properly ripened and tendered with improved color in approximately 48 hours if, after rigor mortis, the beef is introduced at a temperature of approximately 35° F. into the meat ripening space having air-borne Pseudomonas and Achromobacter bacteria where the temperature of the meat is raised to approximately 60 to 90° F.; then held at temperatures of approximately 60 to 90° F. for 24 to 36 hours or more; and then reduced to approximately 35° F., the whole cycle being completed in approximately 48 hours. During the meat ripening cycle the relative humidity is maintained above 90% and up to 100% saturation, including supersaturation for all or part of the time cycle. During the cooling portion of the cycle the air in the meat ripening space is sterilized to provide a sterile atmosphere in the meat ripening space to kill or inhibit the growth of all mold and bacteria in the atmosphere and to substantially inhibit or terminate the action of Pseudomonas and Achromobacter on the surface of the meat.

During the cycling of temperature described above, the air in the space where the chilled meat is being ripened may increase in temperature to approximately 100° F. for up to 40 hours or more, depending upon the meat load, and during the cooling cycle, decrease in temperature from approximately 100° F. to approximately 32° F. in approximately 8 hours, more or less, depending upon the meat load or volume of meat to be chilled to the volume of air space.

Pseudomonas and/or Achromobacter may be introduced both during the heating cycle and during the holding cycle. It is preferred to introduce these cultured bacteria strains periodically into the confined meat aging space, and they are preferably introduced as by spraying in a liquid suspension from an "aerosol" type bomb. The same timing mechanism that times the heating, holding, and cooling cycle in the meat ripening space may also be employed to periodically actuate the atomizer for the Pseudomonas and/or Achromobacter. Other means for introducing these helpful bacteria into the meat aging space can be employed. For example, Pseudomonas or Achromobacter which will become airborne may be dispersed in sawdust or the like and the sawdust, which may contain approximately 1% citric acid, may be scattered on the floor of the enclosed meat ripening space. Other suitable means for introducing these spores into the air of the meat ripening space, such as impregnating air filters, will be obvious to those skilled in the art.

As noted above, during the cooling cycle of approximately 4 to 8 hours, the atmosphere within the meat ripening space is sterilized to destroy bacteria and molds in the atmosphere which are deleterious to the meat, and to substantially terminate the activity of pseudomonas and/or Achromobacter, and thus prevent any tendency toward making the cut red meat surface "slimy." This sterilizing action is preferably continued until the end of the meat ripening cycle; until removal of the meat from the ripening space; and until or shortly after the ripening space is again filled with meat to be ripened. Thus, at the commencement of the ripening cycle the air in the ripening space is substantially sterile. Various means may be employed for sterilizing the air in the ripening space during the cooling cycle, including electrical and mechanical means and/or chemical sprays may be employed. For example, ozone-producing electrostatic precipitation may be employed; ozone-producing ultraviolet rays of lethal wave length may be used; ozone introduced or created within the space in an amount insufficient to cause oxidation or incipient rancidity of the fat, and/or propylene glycol or tributyl tin oxide may be sprayed periodically into the ripening space. Also, a broad spectrum oxytetracycline antibiotic, such as Terramycin, may be sprayed into the air in amounts to produce on the meat 100 parts per million. Here again, the timing mechanism employed to regulate the meat ripening cycle may be employed to periodically spray the chemical sprays into the meat ripening space during sterilization of the atmosphere; or may be employed to actuate the electrical sterilizing apparatus or ozone generator; or actuate combinations thereof.

As used above, the terms "Pseudomonas" and "Achromobacter" are to be understood as including the genus of a large family of bacteria. Many members of the family Pseudomonas and Achromobacter have been identified and the term "Pseudomonas" or "Achromobacter" includes any one or more of these and particularly *Pseudomonas glagei* and *Achromobacter jenseni*, both isolated from aged meat. Both Pseudomonas and Achromobacter are gram negative aerobic bacteria and are non-oxidizing and are not pathological. They can be suspended in a suitable liquid such as sterile water. Pseudomonas exhibits a fluorescent green color when dissolved in water and is sometimes referred to as *Pseudomonas fluorescens*. These bacteria are also facultative psycrophilics and readily adjust to moderate temperature changes. Both are rendered dormant by freezing and are killed by pasteurizing temperatures above 140° F. and are thus killed when meat is cooked.

In an example of the procedures of the present invention, a pair of short loins from the same beef carcass weighing approximately 25 lbs. each and three days from kill were used. One loin was aged by the conventional hanging for twenty-one additional days at 35–40° F. and at 80% relative humidity. The mate loin placed in a sterile cabinet was raised in temperature to approximately 90° F. in the enclosed space during a period of approximately 8 hours and then held between 70° F. and 90 F. for approximately 34 hours. During the heating and holding stages cultures of Pseudomonas and Achromobacter were periodically atomized in a liquid suspension into the enclosed, confined space. At the end of the holding period the temperature of the loin was reduced to approximately 33° F. in approximately 6 hours. At the start of the cycle and during the cooling stage, the air-borne bacteria were destroyed by passing the air constantly over ultraviolet sterilization lamps having a wave length of 2527 Angstrom units. This loin was then quick frozen to await the long hanging aging of the companion loin which, in turn, was frozen for two days to eliminate any variation between the mate loins due to freezing.

The loins were cut into one-inch thick steaks and broiled to 155° F. internal temperature (medium done). A taste panel then judged the steaks, not knowing their history or origin. The steaks aged by conventional procedure were unanimously found to be less tender, less rich in flavor, and with "higher" or more "tainted" taste than the steaks treated by the procedure of the present invention.

In another example of the procedures of the present invention Pseudomonas alone was periodically atomized into enclosed confined space during the heating and holding stages as in the examples described above. The meat so treated had a flavor that would be preferred by many since it is more bland than when both bacteria are used.

When Achromobacter alone was periodically atomized into the enclosed confined space during the heating and holding stages of the present concept as in the example described above an aged flavor for the meat resulted that was stronger and closer to an off or tainted flavor which flavor is preferred by many.

When the bacteria are used together in the present concept a deeper richer flavor is obtained than with either used alone. Each bacteria produces its own characteristic flavor and when acting together synergistically produce a flavor for the meat much superior to the sum of the flavors produced by each bacteria.

Tests conducted on cuts of beef aged, that is, tendered and flavored in accordance with the processes above described, when compared with companion control cuts aged by present commercially acceptable methods show that U.S. Choice beef, aged according to the present invention, averages 10 to 20% more tender and of richer flavor than control; U.S. Good beef averages 20 to 40% better than control; U.S. Commercial beef averages 30 to 50% better than control; and and U.S. Utility beef averages 40 to 50% better than control.

The high humidity employed during the aging or ripening cycle may be obtained by any suitable known means such as, for example, by the use of a bath of heated water in the meat aging space and also by keeping the refrigerating temperature differential at lowest possible minimums.

From the above it is apparent that it is important to the present concept that the meat to be treated be confined in a zone or enclosure having some air circulation for the adequate distribution of Pseudomonas and/or Achromobacter and for the subsequent destruction of same by the air passing over ultraviolet lamps or other suitable means. Also, the volume of meat should be large in comparison to the volume of air in the zone or enclosure. Sterilization during the cooling stage is important if not critical since the action of Pseudomonas and Achromobacter, both in the air and on the meat, should be terminated before the end of the cycle to prevent excessive bacterial action.

It should now be apparent to those skilled in the art that I have provided novel processes for aging or ripening beef and improving the tenderness, color and flavor thereof which in every way satisfy the objectives described above for aging and tendering beef in approximately 2 days, as compared to up to 21 days now required; in which the loss, by reason of trim and shrink, is reduced to a minimum; while the tenderness, organoleptic quality, and appearance of the meat are enhanced.

Changes may be made in the above described processes as by varying the temperature and humidity conditions and by varying the duration of the period of the cycle without departing from the present inventive concept. Reference should therefore be had to the appended claims to determine the scope of this invention.

What is claimed is:

1. In a method of aging and ripening meat to improve its tenderness, color, and flavor, the steps of introducing the beef, after rigor mortis has been completed, into an enclosed spaced and increasing the temperature of the meat in the enclosed spaced to approximately 60 to 90° F., then maintaining the temperature of the meat and of the enclosed space at above 60° F. for approximately 36 hours; periodically introducing bacteria selected from the group consisting of Pseudomonas, Achromobacter and Pseudomonas and Achromobacter into the enclosed space during both the heating and holding periods; then reducing the temperature of the meat to approximately 33 to 35° F.; periodically sterilizing the atmosphere within the enclosed space during the cooling period; and maintaining the relative humidity of the atmosphere within the enclosed space at above approximately 90% during the ripening cycle, whereby the beef becomes properly aged, ripened and improved in tenderness and flavor within an approximate 48 hour period under the conditions described.

2. The method, as described in claim 1, in which a supersaturated atmosphere is maintained at least during part of the time cycle within the enclosed space.

3. The method, as described in claim 1, in which the relative humidity of the atmosphere within the enclosed space is maintained at approximately 100%.

4. The method, as described in claim 1, in which the Pseudomonas is periodically introduced into the enclosed space in a liquid suspension.

5. The method, as described in claim 1, in which the

Achromobacter is periodically introduced into the enclosed space in a liquid suspension.

6. The method, as described in claim 1, in which the atmosphere within the enclosed space is sterilized initially and during the cooling period by periodically spraying a compound selected from the group consisting of propylene glycol and tributyl tin oxide into the enclosed space.

7. The method, as described in claim 1, in which the atmosphere within the enclosed space is sterilized initially and during the cooling period by periodically charging the air by means of electrostatic precipitation within the enclosed space.

8. The method, as described in claim 1, in which the atmosphere within the enclosed space is sterilized initially and during the cooling period by ultraviolet light of an intensity and wave length lethal to bacteria.

9. The method as described in claim 1, in which the atmosphere within the enclosed space is sterilized initially and during the cooling period by periodically spraying into the enclosed space a broad spectrum oxytetracycline antibiotic.

10. The method, as described in claim 1, in which the atmosphere within the enclosed space elevates the meat temperature from approximately 35° F. to approximately 60–90° F. in up to 8 hours during the heating period and decreases the meat temperature from approximately 60–90° F. to approximately 35° F. in approximately 4 to 8 hours during the cooling period.

References Cited in the file of this patent

UNITED STATES PATENTS

| | | |
|---|---|---|
| 2,225,783 | Jensen et al. | Dec. 24, 1940 |
| 2,816,836 | Williams | Dec. 17, 1957 |
| 2,852,391 | Williams | Sept. 16, 1958 |